United States Patent
Ren et al.

(10) Patent No.: US 11,249,251 B2
(45) Date of Patent: Feb. 15, 2022

(54) VARIABLE BANDWIDTH MICRORING OPTICAL FILTER DEVICE AND METHOD WITH FREQUENCY TUNING

(71) Applicants: Yang Ren, Edmonton (CA); Vien Van, Edmonton (CA); Zhiping Jiang, Kanata (CA)

(72) Inventors: Yang Ren, Edmonton (CA); Vien Van, Edmonton (CA); Zhiping Jiang, Kanata (CA)

(73) Assignee: Huawei Technologies Co. Ltd., Shenzhen (CN)

( * ) Notice: Subject to any disclaimer, the term of this patent is extended or adjusted under 35 U.S.C. 154(b) by 0 days.

(21) Appl. No.: 16/929,996

(22) Filed: Jul. 15, 2020

(65) Prior Publication Data

US 2022/0019023 A1 Jan. 20, 2022

(51) Int. Cl.
*G02B 6/12* (2006.01)
*G02F 1/21* (2006.01)
(Continued)

(52) U.S. Cl.
CPC ......... *G02B 6/12007* (2013.01); *G02F 1/212* (2021.01); *G02B 6/29343* (2013.01);
(Continued)

(58) Field of Classification Search
CPC ............ G02B 6/12007; G02B 6/29343; G02B 6/29353; G02B 6/29395; G02F 1/212; G02F 2203/15; H04B 10/5051
See application file for complete search history.

(56) References Cited

U.S. PATENT DOCUMENTS

2008/0166095 A1* 7/2008 Popovic ................ G02F 1/3133
385/126
2008/0219614 A1* 9/2008 Gill ........................ G02F 1/225
385/3
(Continued)

FOREIGN PATENT DOCUMENTS

CN 109378707 A 2/2019

OTHER PUBLICATIONS

Long Chen, Nicolas Sherwood-Droz, and Michal Lipson, "Compact bandwidth-tunable microring resonators," Optics Letters, vol. 32, 3361-3363 2007.
(Continued)

*Primary Examiner* — Leslie C Pascal

(57) ABSTRACT

Methods and devices that provide a variable-bandwidth optical filter with frequency tuning are disclosed. A universal variable bandwidth optical filter architecture is disclosed, based on microring resonators that can vary both operation wavelength and bandwidth with no extra complexity relative to conventional wavelength tunable filters. The filter architecture provides a universal filter design for any arbitrary shape of filter response, such as second-order, fourth-order, sixth-order, and so on. The filter characteristics—insertion loss, in-band ripple, and out-of-band rejection level—may be maintained over the bandwidth tuning range. There is no need for extra heaters to tune the filter's operating bandwidth, as the same heaters used to tune the filter frequency can be used to tune filter bandwidth. The device can be used as an add/drop filter.

12 Claims, 11 Drawing Sheets

(51) Int. Cl.
*G02B 6/293* (2006.01)
*H04B 10/50* (2013.01)

(52) U.S. Cl.
CPC ...... *G02B 6/29353* (2013.01); *G02B 6/29395* (2013.01); *G02F 2203/15* (2013.01); *H04B 10/5051* (2013.01)

(56) References Cited

U.S. PATENT DOCUMENTS

| | | | |
|---|---|---|---|
| 2012/0189310 A1* | 7/2012 | Rasras | G02B 6/12007 398/85 |
| 2013/0188969 A1* | 7/2013 | Mizrahi | G01B 9/02049 398/188 |
| 2017/0010419 A1* | 1/2017 | Jiang | G02B 6/29338 |
| 2017/0090268 A1* | 3/2017 | O'Sullivan | G02F 1/3132 |
| 2021/0021102 A1* | 1/2021 | Zhao | H01S 5/1032 |

OTHER PUBLICATIONS

G. Poulopoulos et. al., "Air Trenches-Assisted Highly Selective, Fully Flexible SOI Filtering Element," 2019 Optical Fiber Communications Conference and Exhibition (OFC), San Diego, CA, USA, 2019, pp. 1-3. 2019.

Yunhong Ding, Minhao Pu, Liu Liu, Jing Xu, Christophe Peucheret, Xinliang Zhang, Dexiu Huang, and Haiyan Ou, "Bandwidth and wavelength-tunable optical bandpass filter based on silicon microring-MZI structure," Optics Express, vol. 19, 6462-6470 2011.

T. Dai et al., "Scalable Bandwidth-Tunable Micro-Ring Filter Based on Multi-Channel-Spectrum Combination," IEEE Photonics Technology Letters, vol. 30, No. 11, pp. 1044-1047 Jun. 1, 2018.

J. R. Ong, R. Kumar and S. Mookherjea, "Ultra-High-Contrast and Tunable-Bandwidth Filter Using Cascaded High-Order Silicon Microring Filters," IEEE Photonics Technology Letters, vol. 25, No. 16, pp. 1543-1546 Aug. 15, 2013.

Yishen Huang et al, Push-pull microring-assisted space-and-wavelength selective switch, Optics Letters, vol. 45, No. 10, May 15, 2020, 4 pages.

Richard A. Soref et al., Mach-Zehnder crossbar switching and tunable filtering using N-coupled waveguide Bragg resonators, vol. 26, No. 12, Jun. 11, 2018,OPTICS Express 14959, 13 pages.

* cited by examiner

VARIABLE BANDWIDTH MICRORING OPTICAL FILTER DEVICE AND METHOD WITH FREQUENCY TUNING

RELATED APPLICATIONS

This is the first patent application related to this matter.

FIELD

The present disclosure is related to methods and devices for optical signal processing, and in particular to methods and devices for variable-bandwidth frequency-based filtering of optical signals.

BACKGROUND

Optical communication encodes data in modulated light waveforms in an optical transmission medium, such as a fiber optic cable. In some communication schemes, the optical transmission medium may carry multiple data channels, each data channel occupying a portion of electromagnetic frequency spectrum of a defined bandwidth. As the spectrum used in optical communication networks gets more and more crowded, efficient utilization of optical frequency bandwidth becomes critical for high-speed, high-volume optical networks. One way to increase channel efficiency is by allowing data transmission bandwidth to be variable based on demand. One of the key components of a bandwidth-tunable optical network (also called an elastic optical network) is the variable bandwidth (VB) filter, whose transmission bandwidth can be dynamically varied on demand to allocate variable amounts of frequency bandwidth to a data channel. Some VB filters may also allow the wavelength of the channel (e.g., the center frequency of the channel) to be varied. However, existing VB filter approaches used for silicon photonics technology have limitations that require trade-offs among factors such as control complexity, cost, reconfigurability, and size. Thus, there exists a need for a simple, low-cost, highly configurable variable-bandwidth filter with a small footprint that also enable wavelength or frequency tuning.

SUMMARY

In various embodiments described herein, methods and devices are disclosed that provide a variable-bandwidth optical filter with frequency tuning. A universal variable bandwidth (VB) optical filter architecture is disclosed, based on microring resonators that can vary both operation wavelength and bandwidth with no extra complexity relative to conventional wavelength tunable filters. In some embodiments, the filter architecture described herein may provide a universal filter design for any arbitrary shape of filter response, such as second-order, fourth-order, sixth-order, and so on. The filter characteristics (e.g., insertion loss, in-band ripple, and out-of-band rejection level) may be maintained over the bandwidth tuning range in some embodiments. Some embodiments may obviate the need for extra heaters to tune the filter's operating bandwidth, as the same heaters used to tune the filter frequency can be used to tune filter bandwidth. In some embodiments, the device can be used as an add/drop filter.

As used herein, "filter" shall refer to an optical filter. The terms Mach-Zehnder Interferometer and MZI are used interchangeably to refer to an optical interferometer used to control or modify optical signal transmission.

"Microring resonator" or "MRR" as used herein refers to an optical ring resonator: an optical waveguide in the form of a ring. When an MRR is said to be "operably coupled" to an optical waveguide path (such as an arm of a MZI), this means that a portion of the light passing through the optical waveguide path will become coupled to the microring waveguide, passing around the circumference of the ring and thereby delaying the optical signal and introducing interference patterns into the waveguide that depend on the circumference of the microring and therefore the duration of the delay. The circumference of the microring will thus determine a frequency-dependent phase imparted to the optical signal passing through the waveguide path to which the microring is coupled. Optical frequencies near the resonance frequency of the MRR will acquire the frequency-dependent phase of the MRR, whereas optical frequencies far from this resonance frequency will not acquire an additional phase shift. The microring resonator may therefore act as a phase filter applied to the other optical waveguide path. As the resonance frequency of an MRR is determined by the amount of phase delay (also called "frequency-dependent phase", "phase detune", or simply "phase" in reference to resonators) introduced into the portion of the signal coupled to the ring, varying the phase of an MRR also means varying the resonance frequency and vice versa.

As used herein, the term "equal" may encompass both strict equality and substantial equality. The term "operably coupled" shall refer to two or more elements that act in concert or otherwise affect each other's operation, regardless of whether they are directly or indirectly physically connected or are not physically connected at all. The term "coupling coefficient" shall have its commonly known meaning in the field of resonators. In a simplified understanding, the coupling coefficient characterizes the interaction of two resonators at a resonance frequency.

In some aspects, the present disclosure describes a device. The device has an optical interferometer configured to split an optical input into a first path defined by a first arm and a second path defined by a second arm, a first-arm microring resonator (MRR) operably coupled to the first arm, a second-arm MRR operably coupled to the second arm, a first-arm MRR tuner and a second-arm MRR tuner. The first-arm MRR tuner and second-arm MRR tuner are configured to tune a frequency-dependent phase of the first-arm MRR and a frequency-dependent phase of the second-arm MRR, respectively, such that the first-arm MRR and second-arm MRR share a common coupling coefficient, and the first-arm MRR has a phase equal to the negative of a phase of the second-arm MRR. The device has a coupler configured to combine an optical output of the first path and an optical output of the second path to generate a filtered optical output having a filter bandwidth and filter center frequency based on the frequency-dependent phase of the first-arm MRR and the frequency-dependent phase of the second-arm MRR.

In some examples, the optical interferometer is a Mach-Zehnder Interferometer (MZI).

In some examples, the device further comprises at least one additional pair of tunable MRRs. Each pair of tunable MRRs comprises an additional first-arm MRR operably coupled to the first arm in series with the first-arm MRR, an additional second-arm MRR operably coupled to the second arm in series with the second-arm MRR, an additional first-arm MRR tuner and an additional second-arm MRR tuner. The additional first-arm MRR tuner and an additional second-arm MRR tuner are configured to tune a frequency-dependent phase of the additional first-arm MRR and a frequency-dependent phase of the additional second-arm MRR, respectively, such that the additional first-arm MRR and additional second-arm MRR share a common coupling coefficient, and the additional first-arm MRR has a phase equal to the negative of a phase of the additional second-arm MRR.

In some examples, the first-arm MRR tuner and second-arm MRR tuner each comprises a thermal tuner.

In some examples, each thermal tuner comprises a heater operably coupled to its respective MRR.

In some examples, each tuner comprises a thermal tuner operably coupled to its respective MRR.

In some examples, the frequency-dependent phase of the first-arm MRR and the frequency-dependent phase of the second-arm MRR may be tuned such that the spectral response of the filtered optical output exhibits a second-order transfer function, and the filter bandwidth may be adjusted between a minimum bandwidth and a maximum bandwidth without incurring insertion loss in the filtered optical output as a result of said bandwidth adjustment.

In some examples, the at least one additional pair of tunable MRRs comprises one additional pair of tunable MRRs. The frequency-dependent phase of each of the first-arm MRR, the second-arm MRR, the additional first-arm MRR, and the additional second-arm MRR may be tuned such that the spectral response of the filtered optical output exhibits a fourth-order transfer function, the filter bandwidth may be adjusted between a minimum bandwidth and a maximum bandwidth without incurring insertion loss in the filtered optical output as a result of said bandwidth adjustment, and the filtered optical signal has infinite attenuation at two out-of-band frequencies.

In some examples, the at least one additional pair of tunable MRRs comprises two additional pairs of tunable MRRs. The frequency-dependent phase of each of the first-arm MRR, the second-arm MRR, each additional first-arm MRR, and each additional second-arm MRR may be tuned such that the spectral response of the filtered optical output exhibits a eighth-order transfer function, the filter bandwidth may be adjusted between a minimum bandwidth and a maximum bandwidth without incurring insertion loss in the filtered optical output as a result of said bandwidth adjustment, and the filtered optical signal has infinite attenuation at six out-of-band frequencies.

In some aspects, the present disclosure describes a device. The device has an optical interferometer configured to split an optical input into a first path defined by a first arm and a second path defined by a second arm. The device has a first-arm microring resonator (MRR) operably coupled to the first arm. The device has a second-arm MRR operably coupled to the second arm. The device has a first-arm MRR tuner and a second-arm MRR tuner configured to tune a frequency-dependent phase of the first-arm MRR and a frequency-dependent phase of the second-arm MRR, respectively.

In some examples, the optical interferometer is a Mach-Zehnder Interferometer (MZI).

In some examples, the device further comprises a coupler configured to combine an optical output of the first path and an optical output of the second path to generate a filtered optical output.

In some examples, the device further comprises at least one additional pair of tunable MRRs. Each pair of tunable MRRs comprises an additional first-arm MRR operably coupled to the first arm in series with the first-arm MRR, an additional second-arm MRR operably coupled to the second arm in series with the second-arm MRR, and an additional first-arm MRR tuner and an additional second-arm MRR tuner configured to tune a frequency-dependent phase of the additional first-arm MRR and a frequency-dependent phase of the additional second-arm MRR, respectively.

In some examples, the first-arm MRR tuner and second-arm MRR tuner each comprises a thermal tuner.

In some examples, each thermal tuner comprises a heater operably coupled to its respective MRR.

In some examples, each tuner comprises a thermal tuner operably coupled to its respective MRR.

In some aspects, the present disclosure describes a method. An optical interferometer is used to split an optical input into a first path defined by a first arm and a second path defined by a second arm. A first-arm microring resonator (MRR) operably coupled to the first arm is used to apply a first frequency-dependent phase to the first path. A second-arm MRR operably coupled to the second arm is used to apply a second frequency-dependent phase to the second path. A first-arm MRR tuner and a second-arm MRR tuner are used to tune the first frequency-dependent phase and the second frequency-dependent phase, respectively, such that the first-arm MRR and second-arm MRR share a common coupling coefficient, and the first frequency-dependent phase is equal to the negative of the second frequency-dependent phase. A coupler is used to combine an optical output of the first path and an optical output of the second path to generate a filtered optical output having a filter bandwidth and filter center frequency based on the frequency-dependent phase of the first-arm MRR and the frequency-dependent phase of the second-arm MRR.

In some examples, the optical interferometer is a Mach-Zehnder Interferometer (MZI).

In some examples, an additional first-arm MRR operably coupled to the first arm in series with the first-arm MRR is used to apply a first additional frequency-dependent phase to the first path. An additional second-arm MRR operably coupled to the second arm in series with the second-arm MRR is used to apply a second additional frequency-dependent phase to the second path. An additional first-arm MRR tuner and an additional second-arm MRR tuner are used to tune the first additional frequency-dependent phase and the second additional frequency-dependent phase, respectively, such that the additional first-arm MRR and additional second-arm MRR share a common coupling coefficient, and the first additional frequency-dependent phase is equal to the negative of the second additional frequency-dependent phase.

In some examples, the first frequency-dependent phase and the second frequency-dependent phase may be tuned such that the filter bandwidth may be adjusted between a minimum bandwidth and a maximum bandwidth without incurring insertion loss in the filtered optical output as a result of said bandwidth adjustment.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

In examples disclosed herein, methods and devices are described that provide a variable-bandwidth optical filter with frequency tuning. One or more pairs of microring resonators (MRR) are operably coupled to arms of a Mach-Zehnder Interferometer (MZI) to provide a variable-bandwidth filter with frequency tuning capability. No extra heaters (or other tuners) are required to enable frequency tuning other than the heaters used to tune the bandwidth of the filter. This MRR-MZI configuration of an arbitrary number N of pairs of MRRs coupled to the arms of the MZI provides a universal high-order VB filter architecture. Both the bandwidth and the central wavelength of frequency of the filter may be tuned by tuning the MRR frequency-dependent phases: thus, no coupling tuning is required as in existing techniques. Furthermore, the number of MRR tuners (such as heaters) required to enable bandwidth and frequency tuning is the same as the number of MRRs, providing further potential advantages over existing optical filter architectures. In some embodiments, a wide bandwidth tuning range can be achieved by optimizing the filter coupling coefficients, which may differ from those used by conventional (e.g., flat-top) MRR filters.

Figure 1:
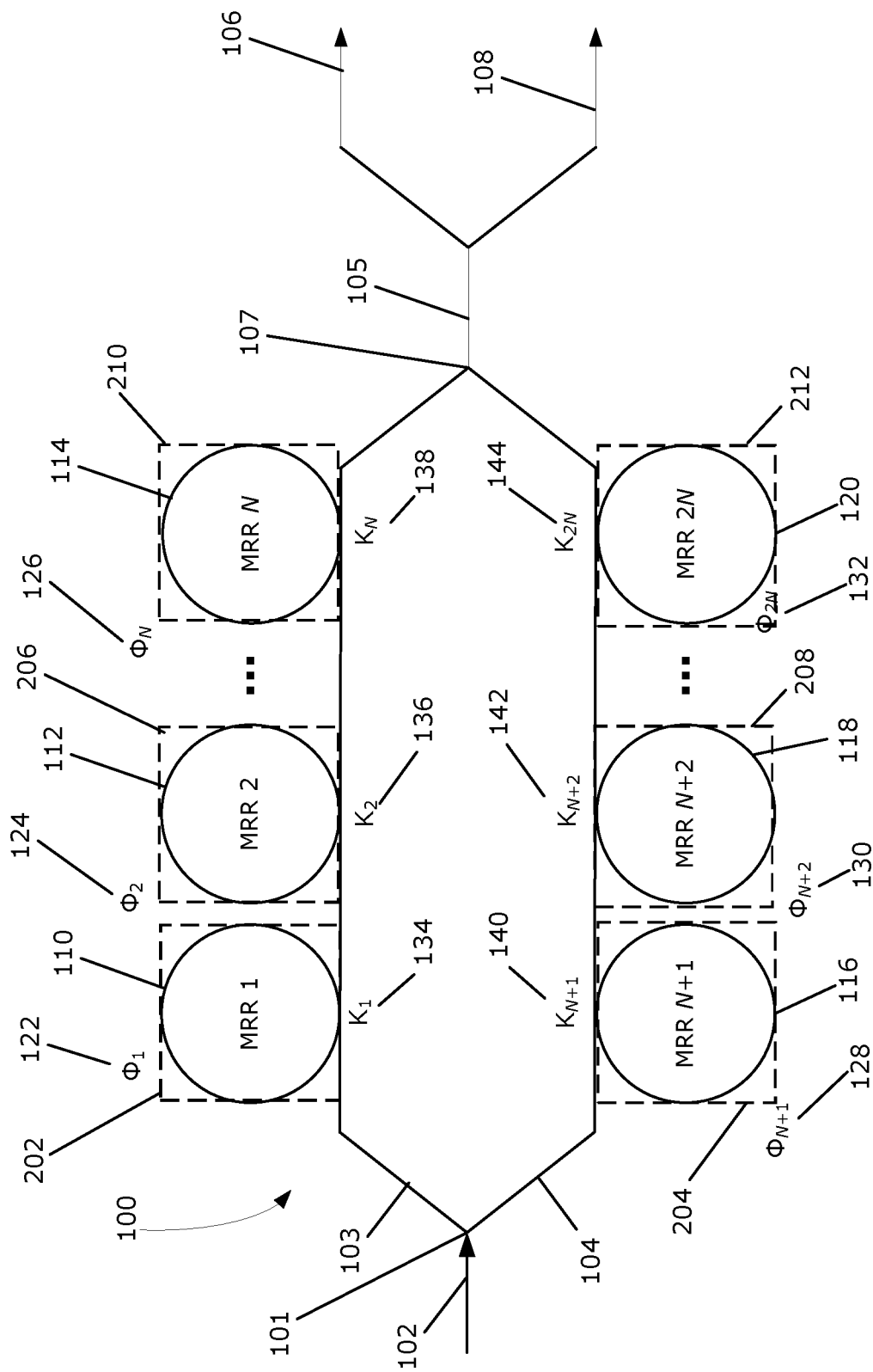
FIG. 1 is a schematic of an example optical filter architecture consisting of a Mach-Zehnder Interferometer (MZI) loaded with N pairs of microring resonators (MRR) (collectively an MRR-MZI), in accordance with examples described herein.

FIG. 1 is a schematic of a variable bandwidth (VB) optical filter 100, which consists of an MZI with each arm of the MZI operably coupled to N MRRs. The example embodiments of FIG. 1 illustrates an extensible architecture for designing optical filters according to the techniques described herein; the number N of pairs of MRRs may be adjusted to achieve a filter response of order (2N). As shown in FIG. 1, the filter 100 is an optical interferometer configured to split an optical input signal 102 into a first path defined by a first arm 103 and a second path defined by a second arm 104 of the MZI. In some embodiments, the filter 100 uses a coupler 101 (e.g. a 3 dB optical coupler) to split the input signal 102 into two signal parts of equal amplitude, one of which travels through the first path, and the other of which travels through the second path.

A first first-arm MRR 110 (denoted "MRR 1") is operably coupled to the first arm 103 to apply a frequency-dependent phase of the first first-arm MRR 110 to the portion of the optical signal traveling through the first path. A first second-arm MRR 116 ("MRR N+1") is operably coupled to the second arm 104 to apply a frequency-dependent phase of the first second-arm MRR 116 to the portion of the optical signal traveling through the second path. Additional pairs of MRRs are operably coupled to the first arm 103 and second arm 104 respectively: MRR 2 112 through MRR N 114 are operably coupled to the first arm 103, and MRR N+2 118 through MRR 2N 120 are operably coupled to the second arm 104. Each additional pair of MRRs may be referred to herein as an additional first-arm MRR and an additional second-arm MRR.

Each MRR in a pair of MRRs is functionally related to the other MRR in the pair, which may be referred to herein as its "counterpart" or "counterpart MRR": thus, MRR 1 110 has counterpart MRR N+1 116, MRR 2 112 has counterpart MRR N+2 118, and so on through MRR N 114 having counterpart MRR 2N 120. This general architecture—an MZI having N pairs of MRRs operably coupled to its arms, with N being an arbitrary positive integer—may be referred to herein as an MRR-loaded MZI or MRR-MZI.

Each MRR is configured and coupled to its respective arm to yield a coupling coefficient K. The coupling coefficient of each MRR is equal to the coupling coefficient of its counterpart MRR. Thus, MRR 1 110 has coupling coefficient $K_1$ 134, which is equal to the coupling coefficient $K_{N+1}$ 128 of MRR N+1 140. Similarly, MRR 2 112 has coupling coefficient $K_2$ 136, which is equal to the coupling coefficient $K_{N+2}$ 142 of MRR N+2 118, through MRR N 114 having coupling coefficient $K_N$ 138, which is equal to the coupling coefficient $K_{2N}$ 144 of MRR 2N 120. The set of coupling coefficients of the MRRs of a given filter design are chosen to obtain a desired filter spectral response of order 2N. In some embodiments, the coupling coefficients may be varied or adjusted after manufacture.

Each MRR 110, 112, 114, 116, 118, 120 is tuned by a respective MRR tuner 202, 204, 206, 208, 210, 212. In some embodiments, the MRR tuners may be thermal tuners, such as metal microheaters operably coupled to the corresponding MRRs to enable MRR tuning using known microring tuning techniques, e.g. selectively heating each microring to adjust its phase and resonance frequency. In some embodiments, the metal microheaters are fabricated in a position above their respective MRRs on a printed circuit board, with a short gap (e.g., 2 micrometers) to prevent direct contact of the metal to the optical waveguide of the MRR.

The frequency-dependent phase of each MRR can be tuned by its respective MRR tuner. The phase of each MRR is defined relative to the chosen center frequency; thus, for example, a first MRR with resonance frequency $f_1$ and a second MRR with resonance frequency $f_{N+1}$ can also be defined as the first MRR having phase $\phi_1$ and the second MRR having phase $\phi_{N+1}$. By tuning the phase $\phi$ of each MRR relative to the chosen center frequency, and thus the resonance frequency of the MRR, the bandwidth of the filter 100 can be varied while maintaining a desired filter spectral shape. The center frequency of the filter can also be tuned in the same way.

In operation, the phase $\phi$ of each MRR of the filter 100 is equal to the negative of the phase of its counterpart MRR. In other words, the two counterpart MRRs of any given pair of MRRs define a pair of resonance frequencies, each equidistant from the chosen center frequency of the filter 100. Thus, MRR 1 110 has phase $\phi_1$ 122, which is equal to the negative of phase $\phi_{N+1}$ 128 of MRR N+1 116. Similarly, MRR 2 112 has phase $\phi_2$ 124, which is equal to the negative of phase $\phi_{N+2}$ 130 of MRR N+2 118, through MRR N 114 having phase $\phi_N$ 126, which is equal to the negative of phase $\phi_{2N}$ 132 of MRR 2N 120. In some embodiments, the phases of each MRRs are optimized by a software algorithm to obtain the desired filter response and bandwidth at the specified center frequency. A computer executing the software algorithm may be connected to the MRR tuners of the filter 100 using known MRR tuning techniques.

In some embodiments, the frequency-dependent phase of the first-arm MRR and the frequency-dependent phase of the second-arm MRR may be tuned to achieve a number of desirable characteristics of the filter 100, as measured in various simulations and experiments whose results are described below with reference to FIGS. 3-5 and 7-11. The filter bandwidth can be adjusted without incurring insertion loss in the filtered optical output. The filter bandwidth can be adjusted between a minimum bandwidth and a maximum bandwidth, the maximum bandwidth being at least three times the minimum bandwidth for a second-order filter, at least seven time the minimum bandwidth for a fourth-order filter, and at least 30 times the minimum bandwidth for an eighth-order filter. The filtered optical signal has an in-band ripple having a magnitude of less than 3 decibels (dB) for a second-order filter, less than 1 decibel for a fourth-order filter, and less than 0.5 decibels for an eighth-order filter.

After passing through the first arm 103 and second arm 104 of the filter 100, the two signal parts are recombined by an output coupler 107 (e.g. another 3 dB optical coupler) to form a filtered optical output 105. The filtered optical output 105 may be further split into a drop signal 106 and a through signal 108 in accordance with known techniques.

Figure 2:
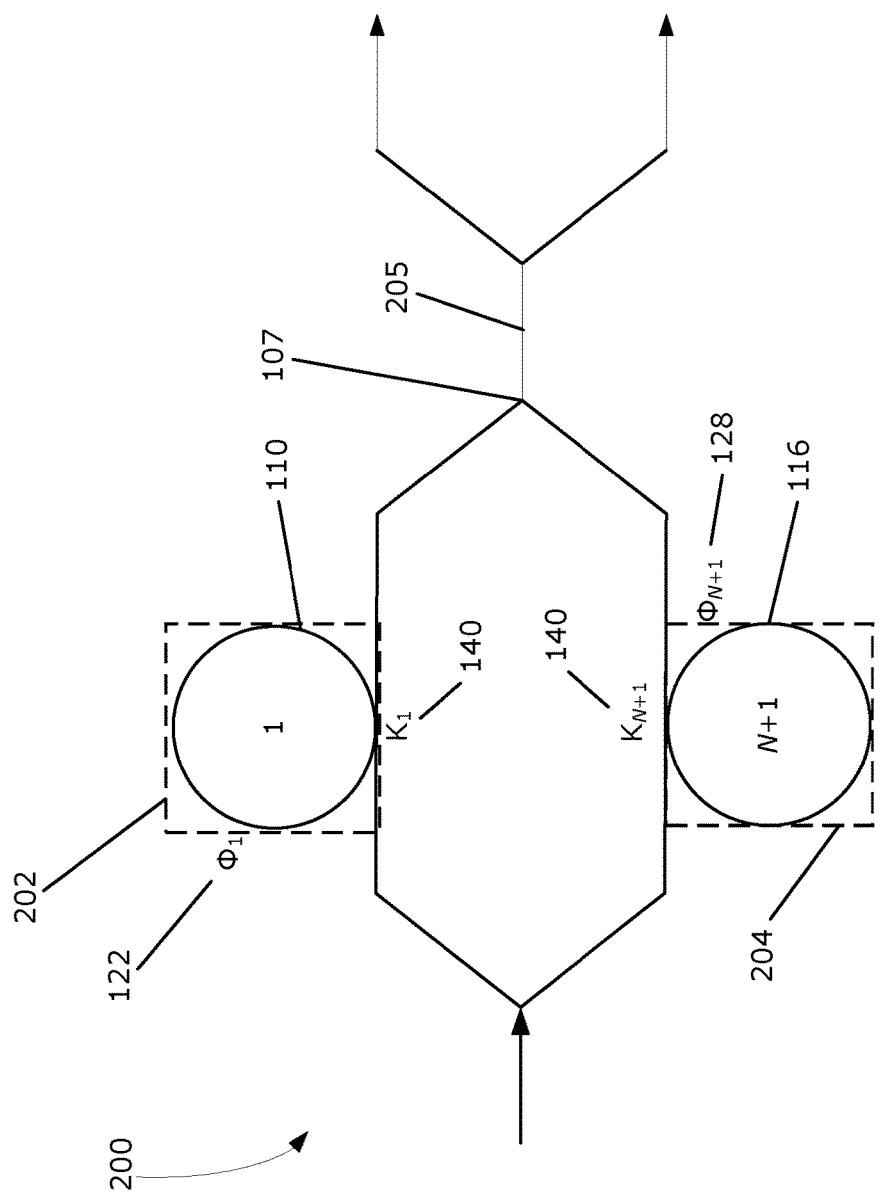
FIG. 2 is a schematic of a second-order optical filter consisting of a Mach-Zehnder Interferometer loaded with one pair of microring resonators, in accordance with examples described herein.

FIG. 2 is a schematic of a second-order filter 200 in accordance with the universal filter architecture of FIG. 1. The second-order filter 200 has only one pair of MRRs (i.e., N=1): first-arm MRR 110 and second-arm MRR 116. A first-arm MRR tuner 202 is shown in dashed lines, indicating a position above the first-arm MRR 110. A second-arm MRR tuner 204 is similarly shown above second-arm MRR 116. Each MRR tuner 202, 204 is configured to tune a frequency-dependent phase of its respective MRR, respectively, such that the first-arm MRR 110 and second-arm MRR 116 share a common coupling coefficient, the first-arm MRR 110 has a phase $\phi_1$ 122 equal to the negative of a phase $\phi_{N+1}$ 128 of the second-arm MRR 116 (i.e. $\phi_1 = -\phi_{N+1}$).

The output coupler 107 is configured to combine the optical output of the first path (i.e. first arm 103) and the optical output of the second path (i.e. second arm 104) to generate a filtered optical output 205. The filtered optical output 205 has a filter bandwidth and filter center frequency based on the phase detune of the first-arm MRR 110 and the phase detune of the second-arm MRR 116. Example plots of filtered optical output 205 are shown in FIG. 3.

Figure 3:
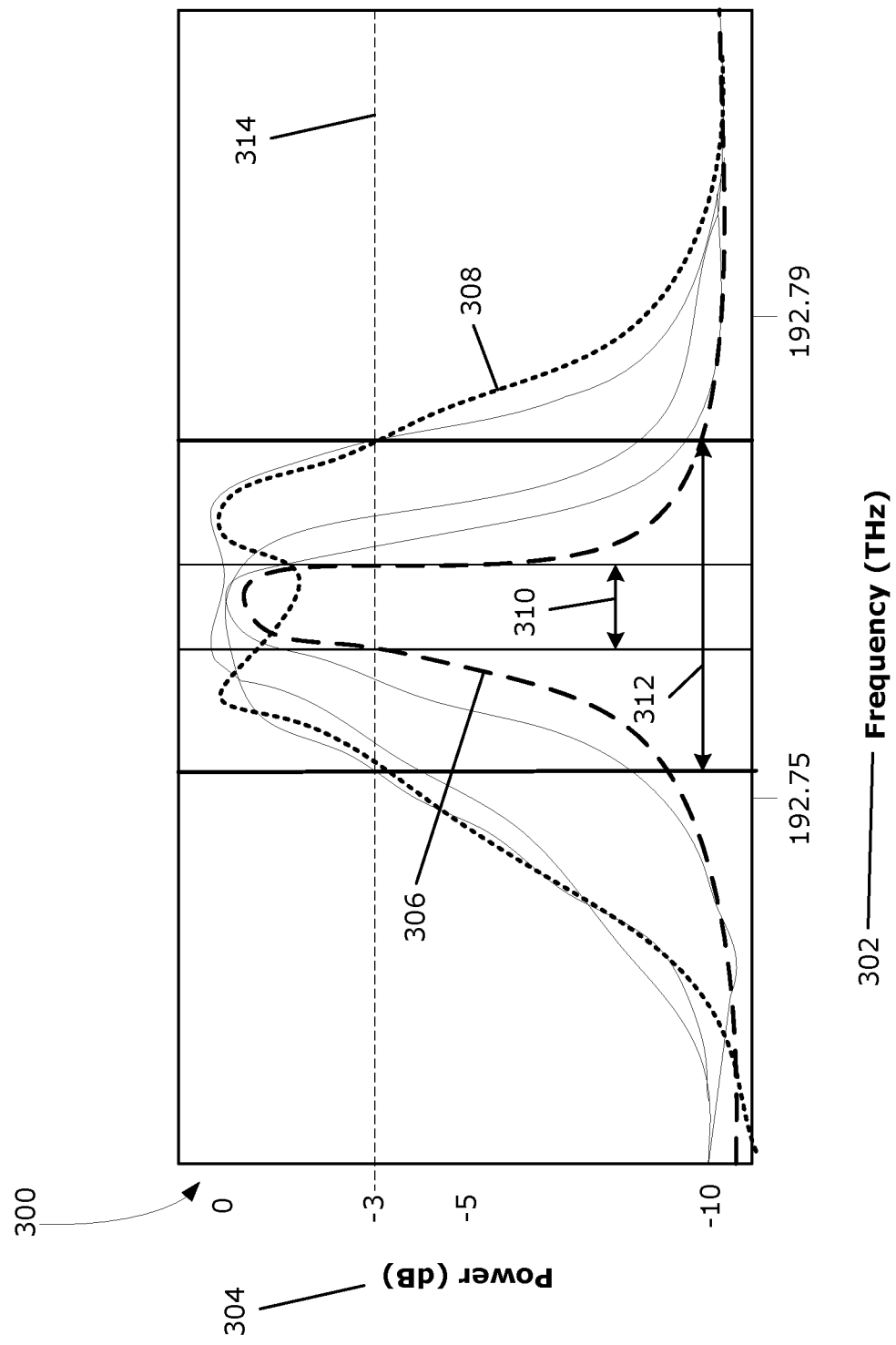
FIG. 3 is a graph of the frequency response of the example second-order filter of FIG. 2, with power (Y axis) plotted against frequency (X axis).

FIG. 3 is a graph of the frequency response 300 of the example second-order filter 200 of FIG. 2, with power 304 (Y axis) plotted in decibels against frequency 302 (X axis) plotted in terahertz. The frequency response is plotted for the filter 200 tuned to several different bandwidths, ranging from a low-bandwidth setting 308 to a higher-bandwidth setting 306. Measuring bandwidth by a 3 decibel loss level 314, example embodiments of the filter 200 have demonstrated the capacity to be tuned to a 3 dB bandwidth between 0.05 nm (6.25 GHz) 310 and 0.17 nm (21.25 GHz) 312, representing more than a three-fold tunable increase in the 3 dB bandwidth. When describing filter behavior in the various embodiments described herein, the term "bandwidth" shall be used to mean the fractional bandwidth of the filter, and specifically the 3 dB bandwidth normalized with respect to the free spectral range (FSR) of the MRRs used in the filter, unless otherwise specified.

Mathematically, varying the bandwidth of a filter means varying the locations of the poles of the filter. Using the example second-order filter 200 described above, the locations of the poles can be changed by varying the phases (or resonance frequencies) of the MRRs. To achieve variable filter bandwidth while maintaining in-band ripple below a specified maximum value, the movement of the poles of the second-order filter 200 may follow the trajectories shown in FIG. 4A.

Figure 4A:
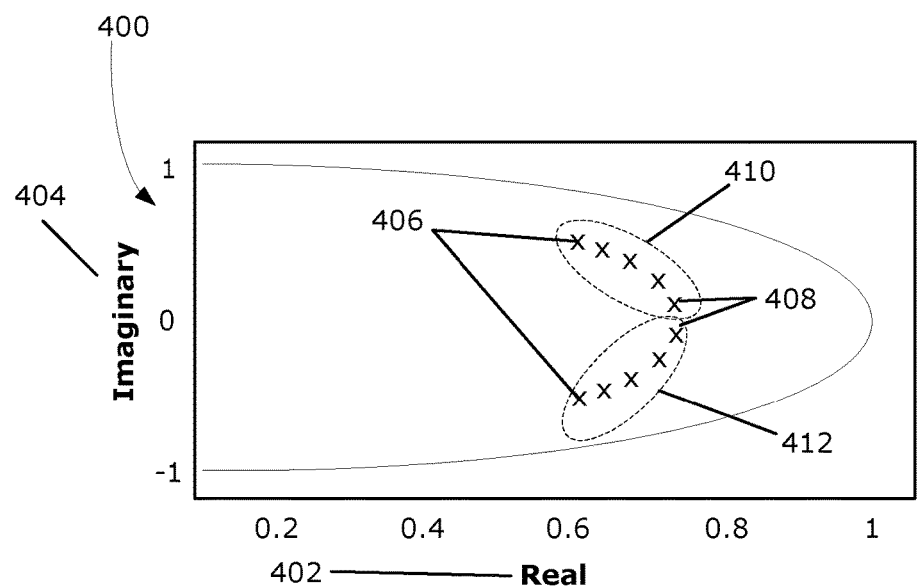
FIG. 4A is a graph of the location of poles of the example second-order filter of FIG. 2 during bandwidth tuning, with the imaginary component (Y axis) plotted against the real component (X axis).

FIG. 4A is a graph 400 of the location of poles of the example second-order filter of FIG. 2 during bandwidth tuning, with the imaginary component 404 (Y axis) plotted against the real component 402 (X axis). The set of poles 410 of the first-arm MRR 110 are shown in a positive imaginary portion of the graph 400, whereas the set of poles 412 of the second-arm MRR 116 are shown in a negative imaginary portion of the graph 400. The real 402 value of each pair of poles (for the first-arm MRR 110 and second-arm MRR 116) are equal to each other. Thus, the MRR on the top arm (first-arm MRR 110) generates a pole that is the complex conjugate of the pole generated by the MRR on the bottom arm (second-arm MRR 116).

When detuning the phase of each MRR 110, 116 around the nominal value (i.e. the phase value corresponding to the center frequency of the filter 200), the poles will rotate around the origin of the graph 400. The more separated the poles, the wider the filter bandwidth. When tuned to a low bandwidth value, the filter 200 has low-bandwidth poles 408. As the bandwidth of the filter 200 is increased through phase tuning, the poles of each MRR move along the illustrated trajectory toward a pair of high-bandwidth poles 406. By tuning the frequency-dependent phases of the MRRs 110, 116, the locations of the poles of the filter 200 travel along the illustrated trajectories. The various bandwidth values shown in this graph 400 correspond to the filter spectral response shown in FIG. 3, which show that the bandwidth can be increase by a factor of more than three. Some embodiments may exhibit an advantage over conventional optical filters insofar as the shape of the spectral response of the filter may be maintained over a tunable bandwidth range by allowing both the poles and zeros of the filter to be moved according to specific trajectories simply by tuning the MRR phases without changing their coupling coefficients.

Figure 4B:
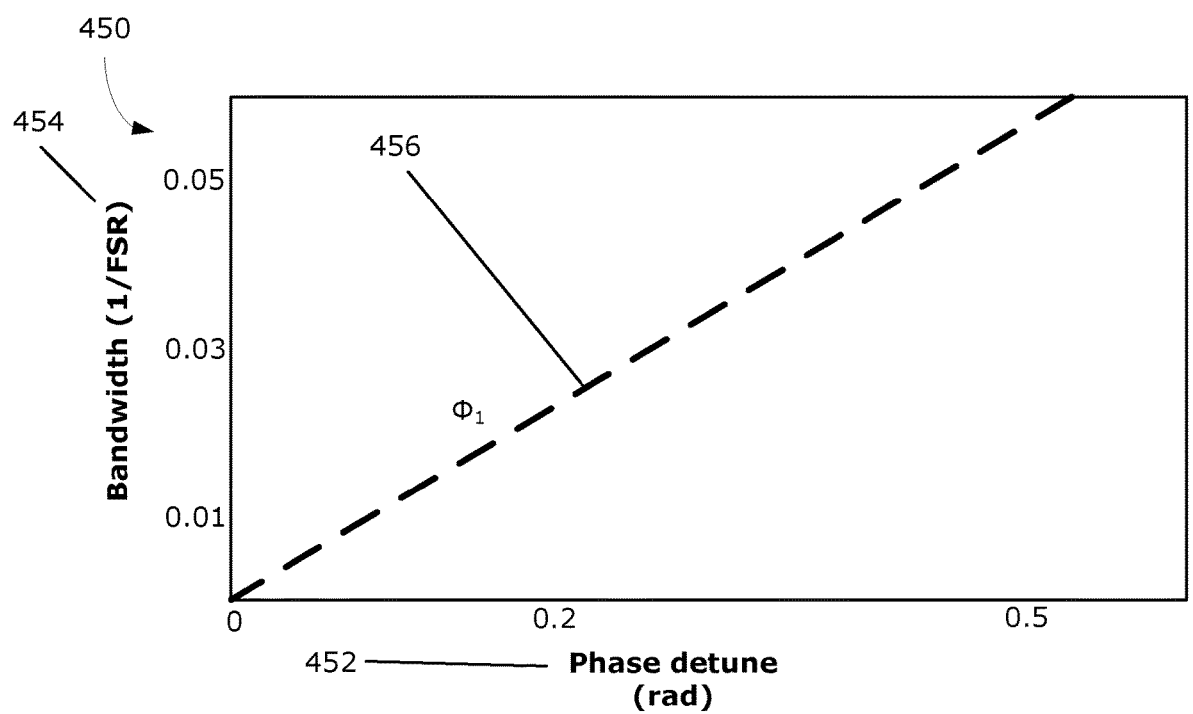
FIG. 4B is a graph of the MRR phase tuning curve of the example second-order filter of FIG. 2, with bandwidth (Y axis) plotted against phase detune (X axis).

FIG. 4B is a graph 450 of the MRR phase tuning curve 456 of the example second-order filter 200 of FIG. 2, with fractional bandwidth 454 (Y axis), measured relative to the free spectral range (FSR) of the filter 200, plotted against phase detune 452 (X axis), measured in radians. The phase tuning curve 456 indicates the phase $\phi_1$ 122 for the first-arm MRR 110 required to obtain a given fractional bandwidth for the filter 200. The second-arm MRR 116 has a phase $\phi_{N+1}$ 128 equal to the negative of Di 122. It will be appreciated that the phase detune increases in magnitude (positive or negative) as higher bandwidth is needed.

Figure 5:
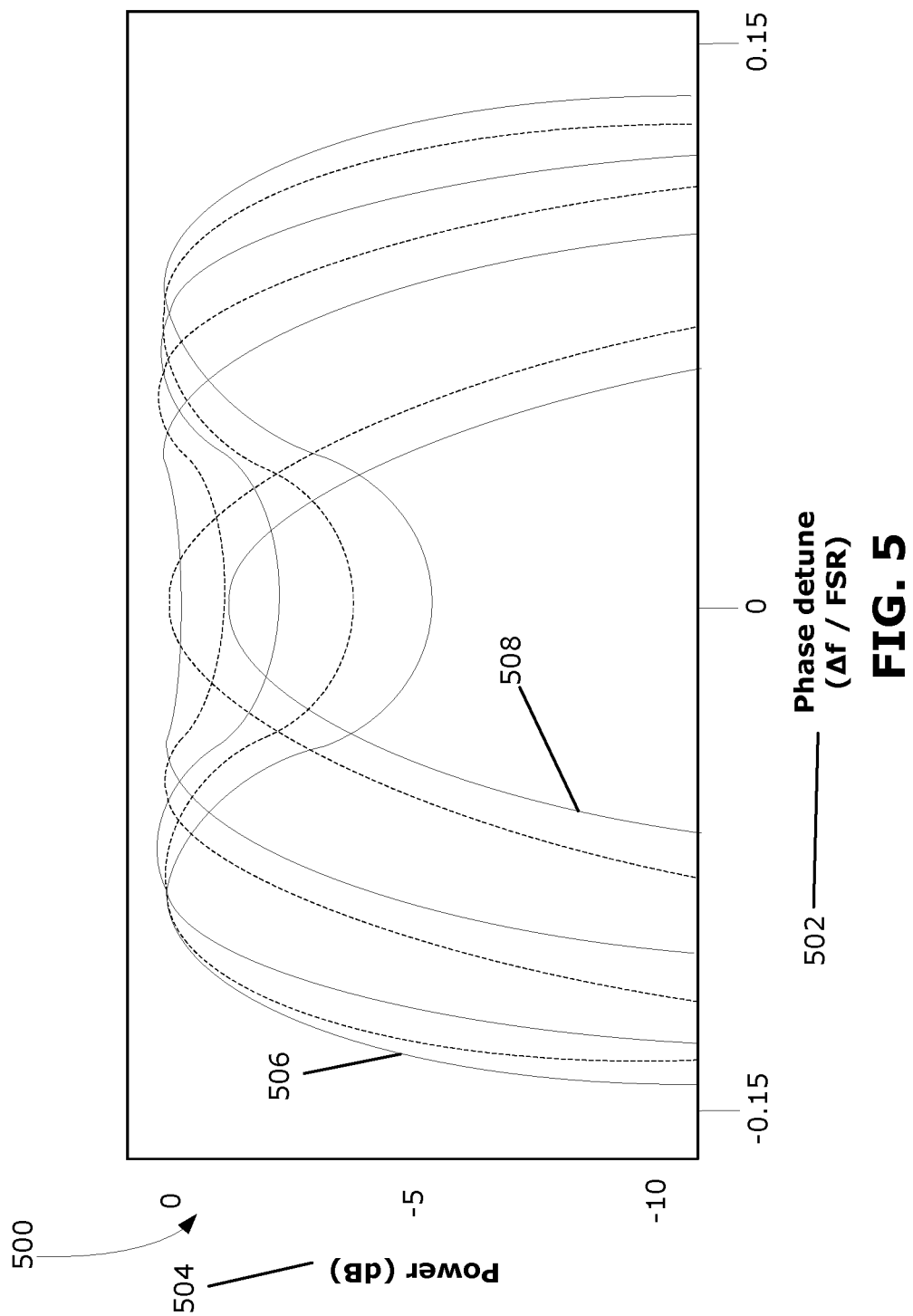
FIG. 5 is a graph of the simulated ripples in the passband of the example second-order filter of FIG. 2, with power (Y axis) plotted against phase detune (X axis).

FIG. 5 is a graph 500 of simulated ripples 506, 508 in the passband of the example second-order filter 200 of FIG. 2, with power 504 (Y axis), measured in decibels, plotted against phase detune 502 (X axis), here measured in the fractional bandwidth measured relative to the FSR of the filter 200. The in-band ripple is shown at various filter bandwidths corresponding to the filter bandwidths plotted in FIGS. 3, 4A, and 4B, from a high bandwidth ripple 506 to a low-bandwidth ripple 508, with adjacent bandwidth values alternating between solid and dashed lines.

Because only 2 MRRs 110, 116 are used in the second-order filter 200, a maximum in-band ripple of approximately 2.5 dB may be incurred in some embodiments, and no additional insertion loss may be incurred due to bandwidth tuning in some embodiments. In some embodiments, such as the illustrated example of FIG. 5, the maximum in-band ripple is kept within a 0.5 dB tolerance (e.g., between 0 dB and −5 dB as illustrated).

Figure 6:
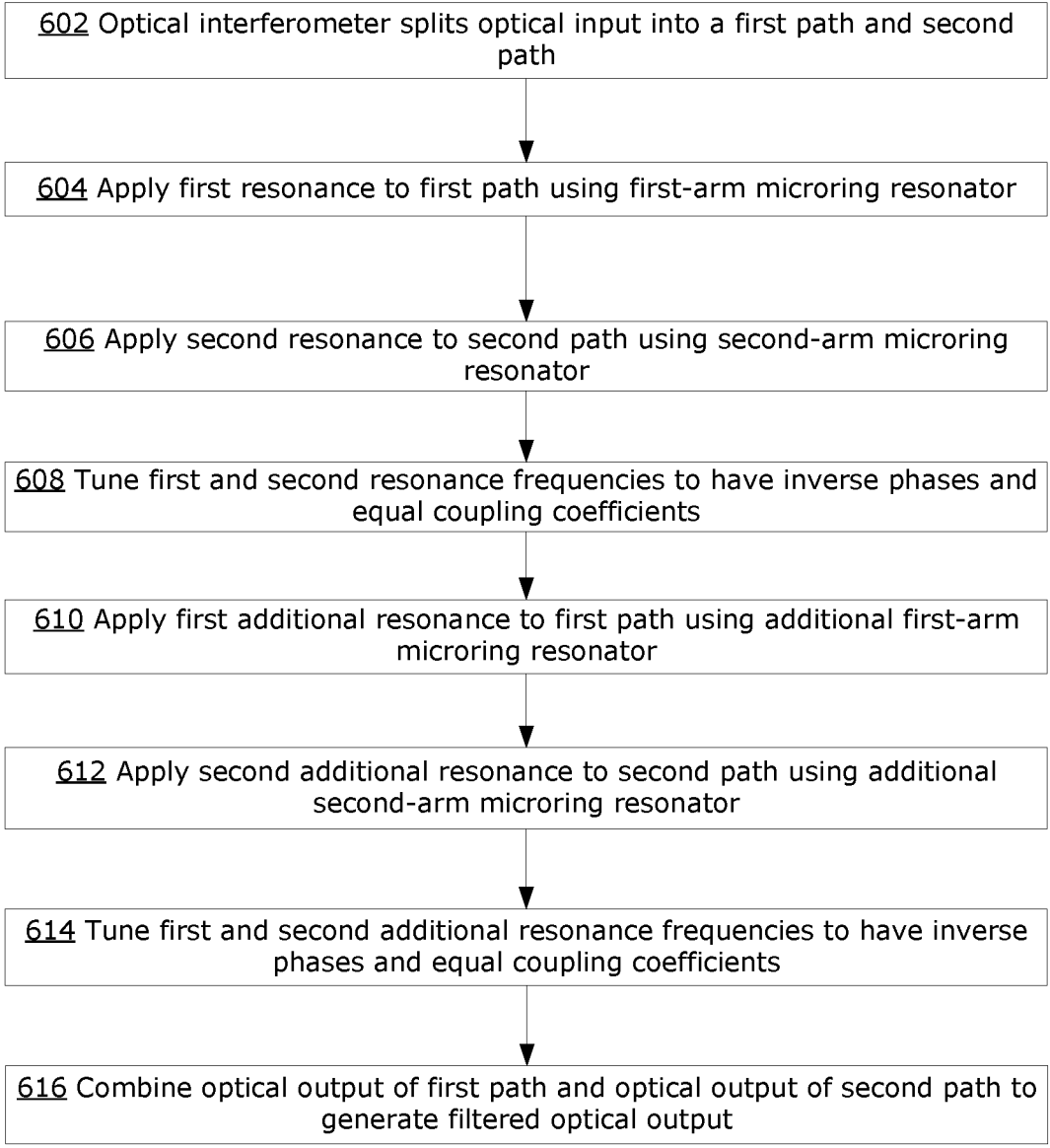
FIG. 6 is a flowchart showing an example method of tuning an optical filter to achieve a desired bandwidth and center frequency, in accordance with examples described herein.

FIG. 6 is a flowchart showing an example method 600 of tuning an optical filter to achieve a desired bandwidth and center frequency. The method 600 will be described with reference to the example optical filter 100 of FIG. 1. It will be appreciated that the example filter 100 of FIG. 1 provides an extensible framework or architecture for constructing optical filters of arbitrary order N by coupling N pairs of MRRs to the arms of the MZI.

At 602, an optical interferometer is used to split an optical input 102 into a first path defined by a first arm 103 and a second path defined by a second arm 104. The optical splitting may be achieved by a coupling 101 in some embodiments. The optical interferometer is a Mach-Zehnder Interferometer (MZI) in some embodiments.

At 604, a first-arm microring resonator (MRR) 110 operably coupled to the first arm 103 is used to apply a first frequency-dependent phase to the first path.

At 606, a second-arm MRR 116 operably coupled to the second arm 104 is used to apply a second frequency-dependent phase to the second path.

At 608, a first-arm MRR tuner 202 and a second-arm MRR tuner 204 are used to tune the first frequency-dependent phase and the second frequency-dependent phase, respectively. The frequency-dependent phases of the MRRs 110, 116 are tuned such that the first-arm MRR 110 and second-arm MRR 116 share a common coupling coefficient ($K_1$ 134=$K_{N+1}$ 140), and the first-arm MRR 110 has a phase $\phi_1$ 122 equal to the negative of a phase $\phi_{N+1}$ 128 of the second-arm MRR 116. In some embodiments, the first frequency-dependent phase and the second frequency-dependent phase may be tuned such that the filter bandwidth is adjusted without incurring insertion loss in the filtered optical output as a result of said bandwidth adjustment, as described above. In some embodiments, the filter bandwidth may be adjusted between a minimum bandwidth and a maximum bandwidth, the maximum bandwidth being at least three times the minimum bandwidth, as described above. In some embodiments, the filtered optical signal has an in-band ripple having a magnitude of less than 3 decibels (dB).

At 610, an additional first-arm MRR (such as first additional first-arm MRR 2 112) operably coupled to the first arm 103 in series with the first-arm MRR 110 is used to apply a first additional frequency-dependent phase to the first path.

At 612, an additional second-arm MRR (such as first additional second-arm MRR N+2 118) operably coupled to the second arm 104 in series with the second-arm MRR 116 is used to apply a second additional frequency-dependent phase to the second path.

At 614, an additional first-arm MRR tuner 206 and an additional second-arm MRR tuner 208 are used to tune the first additional frequency-dependent phase of the additional first-arm MRR 112 and the second additional frequency-dependent phase of the additional second-arm MRR 118, respectively. The additional first-arm MRR 112 and additional second-arm MRR 118 share a common coupling coefficient ($K_2$ 136=$K_{N+2}$ 142), and the additional first-arm MRR 112 has a phase equal to the negative of a phase of the additional second-arm MRR 118.

At 616, a coupler 107 is used to combine an optical output of the first path and an optical output of the second path to generate a filtered optical output 105 having a filter bandwidth and filter center frequency based on the frequency-dependent phase of the first-arm MRR 110 and the frequency-dependent phase of the second-arm MRR 116.

It will be appreciated that the steps of the method 600 are described in a specific order, but these steps may be performed in a different order or simultaneously. In particular, the steps of method 600 are performed on a continuous basis by the various components of the filter 100.

By setting the number of pairs of MRRs in the filter 100 higher than one (N>1), higher-order filters may be implemented exhibiting higher-order filter behavior than the second-order filter 200 of FIG. 2. A fourth-order filter having two pairs of MRRs (N=2), and an eighth-order filter having four pairs of MRRs (N=4), will now be described with reference to FIGS. 7-11.

Figure 7:
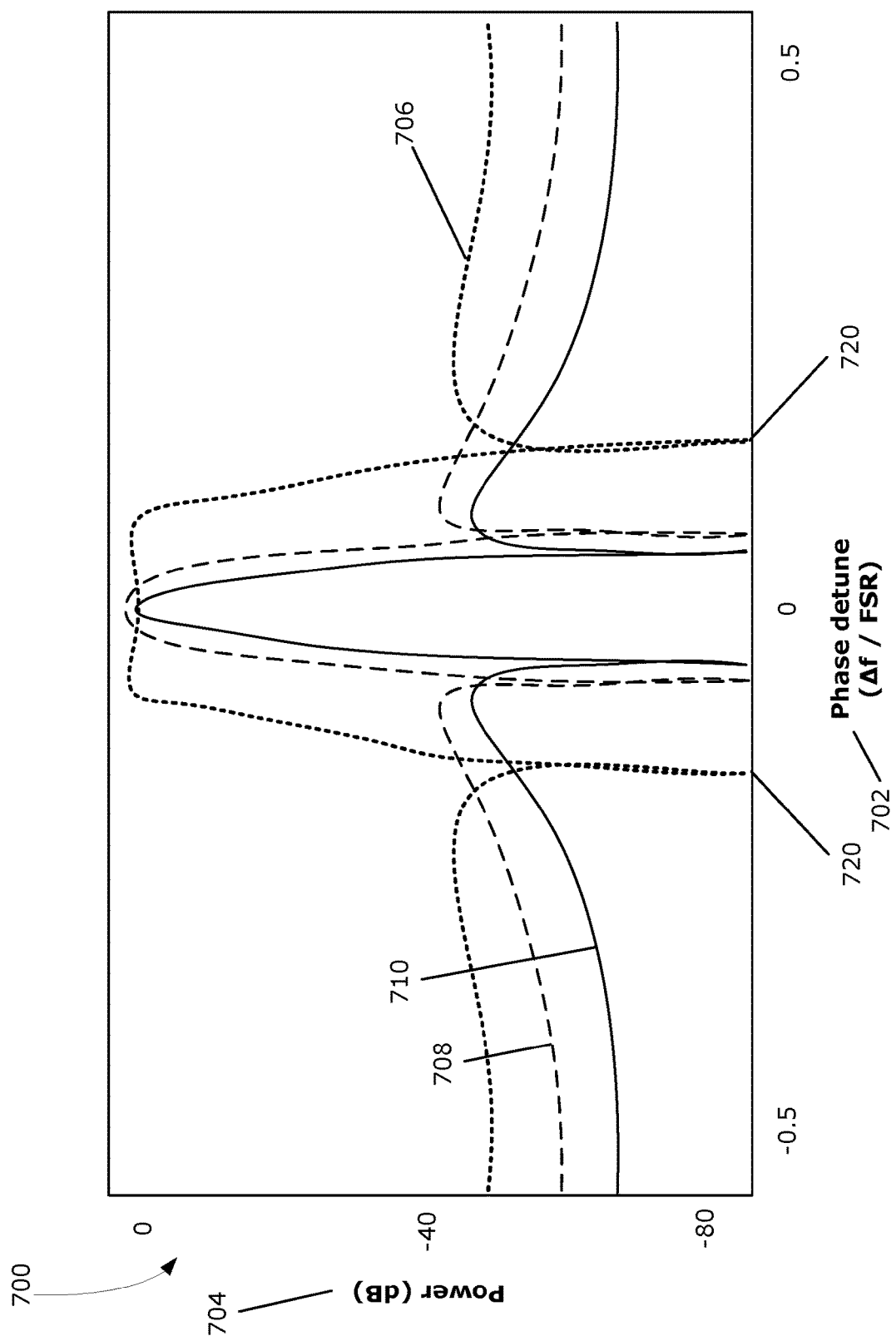
FIG. 7 is a graph of the frequency response of an example fourth-order filter, with power (Y axis) plotted against phase detune (X axis), in accordance with examples described herein.

FIG. 7 is a graph 700 of the frequency response of an example fourth-order filter, with power 704 (Y axis), measured in decibels, plotted against phase detune 702 (X axis), measured as fractional bandwidth relative to FSR. In contrast to the graphed frequency response of the second-order filter 200 in FIG. 3, the X axis in this graph 700 is measured as the phase detune relative to the center frequency, as opposed to the frequency of each plotted curve showing absolute bandwidth in terahertz. The frequency response of the fourth-order filter is plotted in FIG. 7 at three bandwidth tuning values: a high-bandwidth value 706, a medium-bandwidth value 708, and a low-bandwidth value 710. In some embodiments, the fractional bandwidth $\Delta f/FSR$, graphed as the X axis 702, has demonstrated the capacity to be varied from $\Delta f/FSR=0.01$ to $\Delta f/FSR=0.08$, representing an 8-fold increase in the 3 dB bandwidth.

Figure 8:
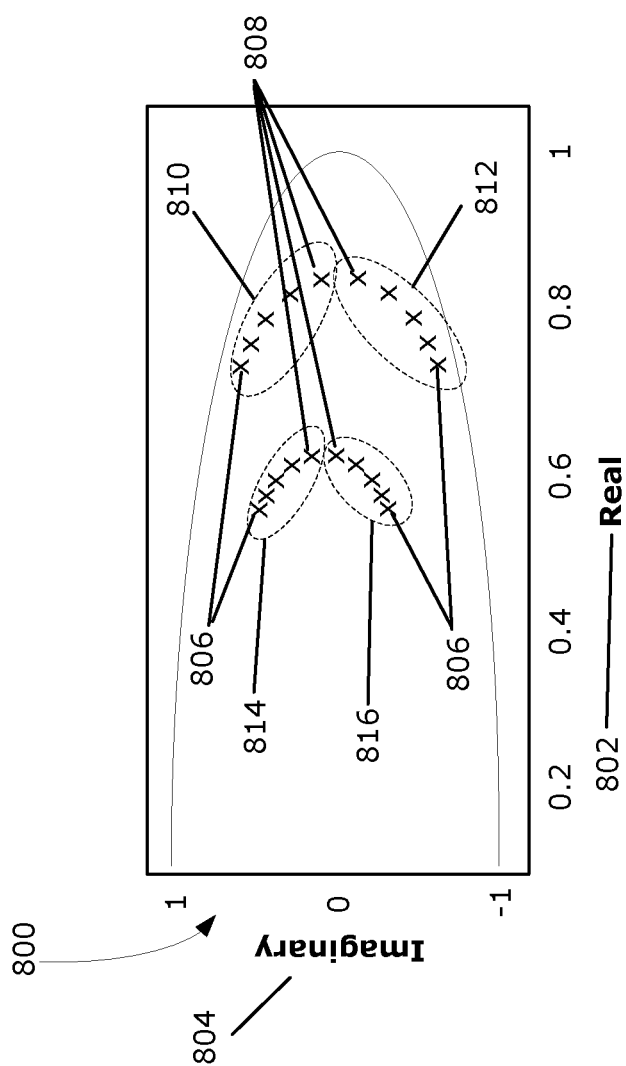
FIG. 8 is a graph of the location of poles of an example fourth-order filter, with the imaginary component (Y axis) plotted against the real component (X axis).

FIG. 8 is a graph 800 of the location of poles of the example fourth-order filter of FIG. 7, with the imaginary component 804 (Y axis) plotted against the real component 802 (X axis). A first set of poles 810 show the pole locations of the first-arm MRR 110; a second set of poles 812 show the location of the poles of the second-arm MRR 116; a third set of poles 814 show the pole locations of the additional first-arm MRR 112; and a fourth set of poles 816 show the location of the poles of the additional second-arm MRR 118. As in FIG. 4A, the poles closer to the imaginary zero value 808 correspond to a low-bandwidth tuning value for the filter, whereas the poles farther from the imaginary zero value 806 correspond to a high-bandwidth tuning value for the filter.

In some embodiments, the maximum in-band ripple of the fourth-order filter of FIGS. 7-8 has been demonstrated to be less than 1 dB, with no additional insertion loss being incurred due to bandwidth tuning.

Figure 9:
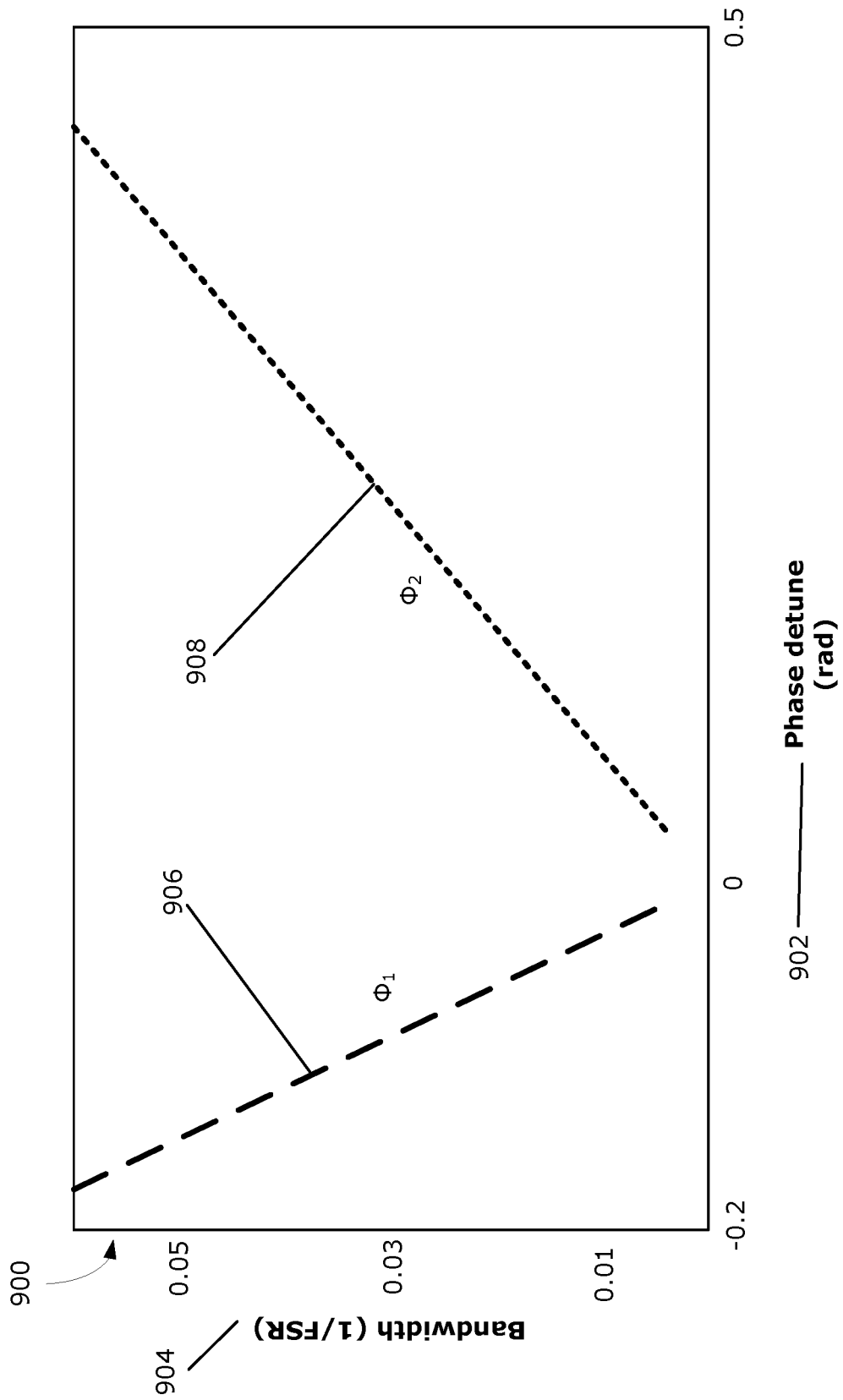
FIG. 9 is a graph of the MRR phase tuning curves of an example fourth-order filter, with bandwidth (Y axis) plotted against phase detune (X axis).

FIG. 9 is a graph 900 of the MRR phase tuning curves of an example fourth-order filter, with fractional bandwidth 904 (Y axis), measured relative to FSR, plotted against phase detune 902 (X axis), measured in radians. The first phase tuning curve 906 indicates the phase $\phi_1$ 122 for the first-arm MRR 110, and the second phase tuning curve 908 indicates the phase $\phi_2$ 124 for the additional first-arm MRR 112, required to obtain a given fractional bandwidth for the fourth-order filter.

Figure 10:
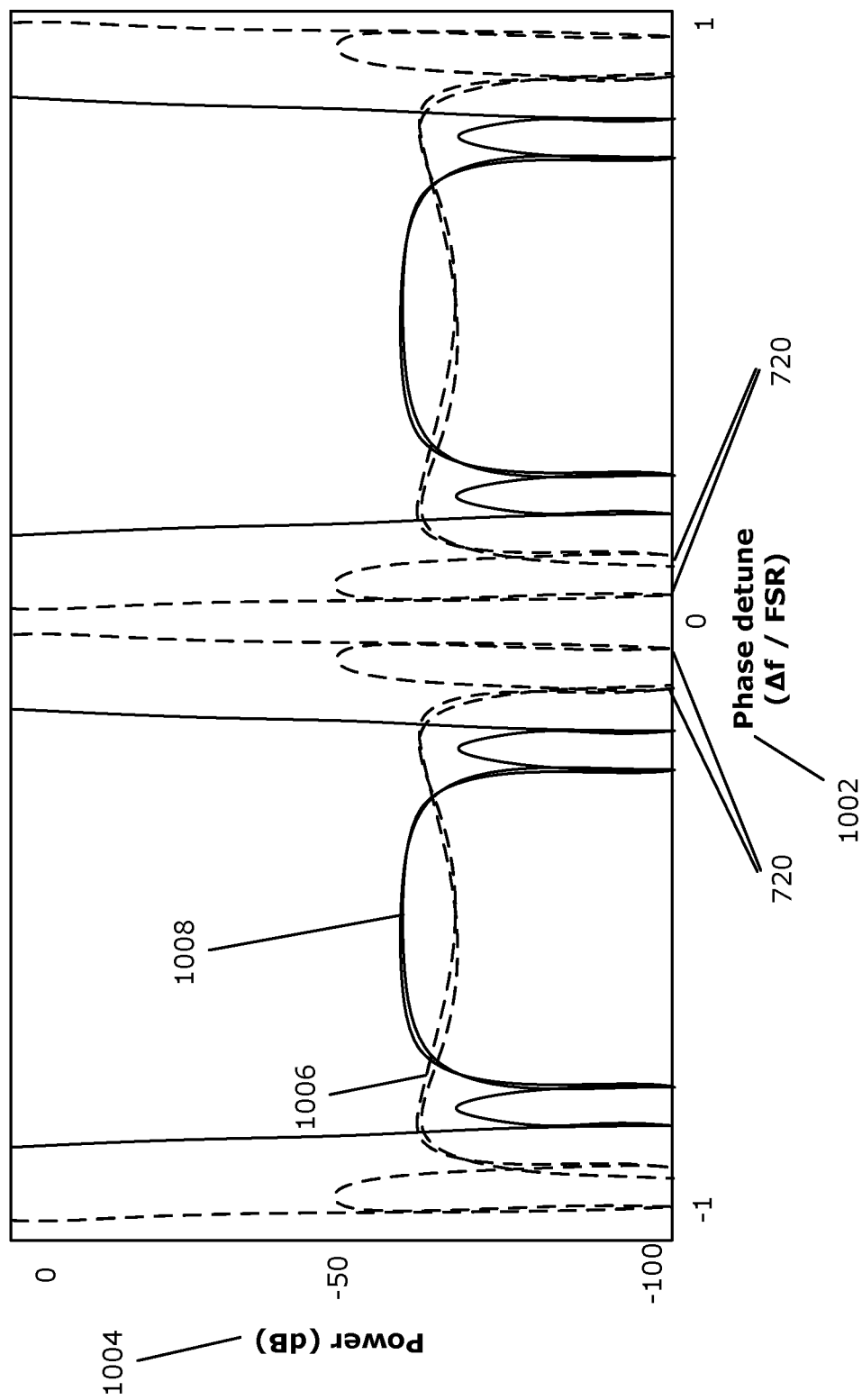
FIG. 10 is a graph of the frequency response of an example eighth-order filter, with power (Y axis) plotted against phase detune (X axis), in accordance with examples described herein.

FIG. 10 is a graph 1000 of the frequency response of an example eighth-order filter, with power 1004 (Y axis), measured in decibels, plotted against phase detune 1002 (X axis), measured as bandwidth ($\Delta f$) over FSR. The graph 1000 shows a low-bandwidth frequency response 1008 as a solid line, and a high-bandwidth frequency response 1006 as a dashed line. In some embodiments, the ratio of bandwidth to FSR, graphed as the X axis 1002, has demonstrated the capacity to be varied from $\Delta f/FSR=0.01$ to $\Delta f/FSR=0.3$, representing a 30-fold increase in the 3 dB bandwidth.

Figure 11:
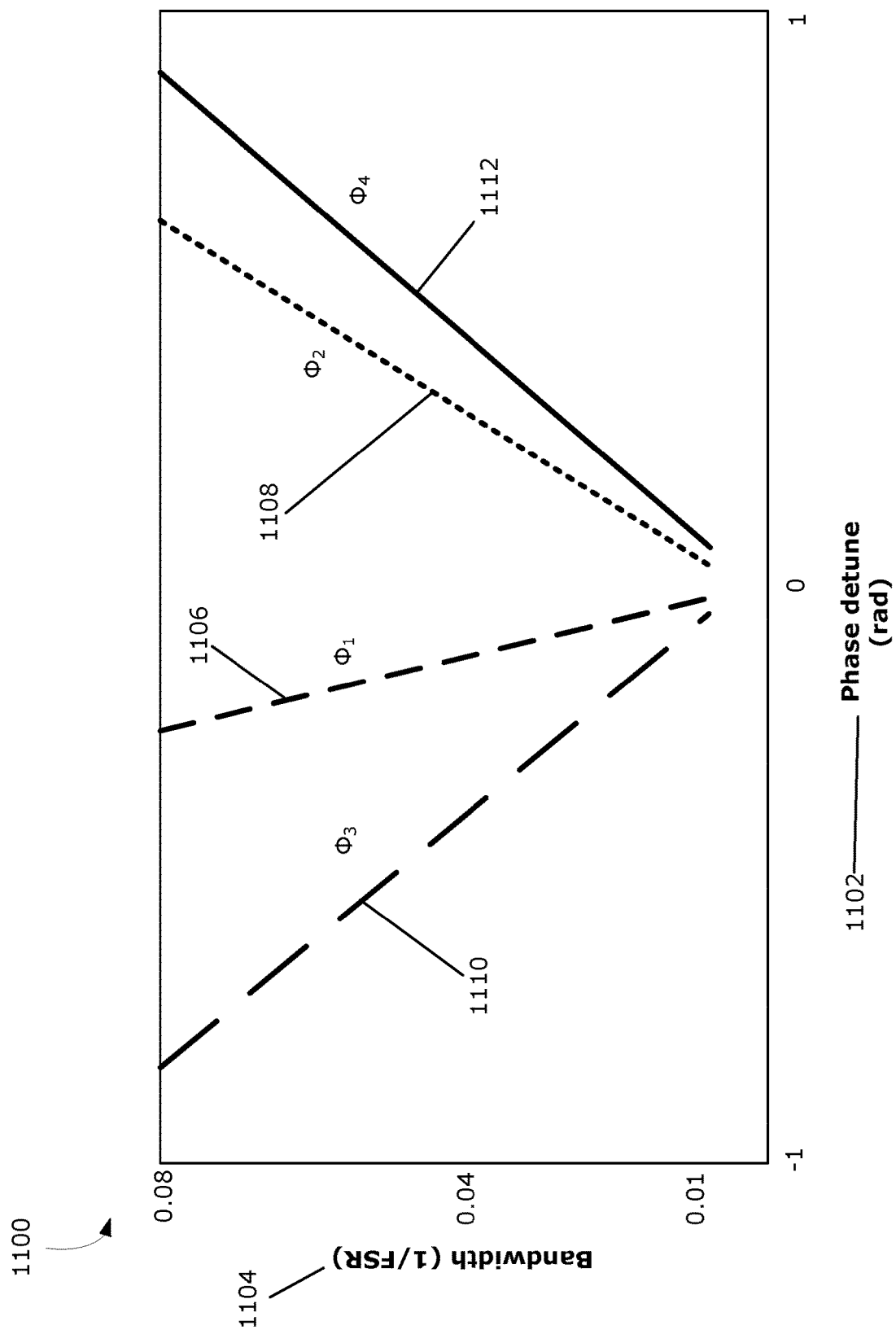
FIG. 11 is a graph of the MRR phase tuning curves of an example eighth-order filter, with bandwidth (Y axis) plotted against phase detune (X axis).

FIG. 11 is a graph 1100 of the MRR phase tuning curves of the example eighth-order filter of FIG. 10, with fractional bandwidth 1104 (Y axis), measured relative to an FSR, plotted against phase detune 1102 (X axis), measured in radians. The four phase tuning curves for the four pairs of MRRs show the phase detune values that the MRR tuners need to set to achieve a given fractional bandwidth for the eighth-order filter: the first phase tuning curve 1106 indicates the phase $\phi_1$ 122 for the first-arm MRR 110, the second phase tuning curve 1108 indicates the phase $\phi_2$ 124 for the first additional first-arm MRR 112, the third phase tuning curve 1110 indicates the phase $\phi_3$ 126 for the second additional first-arm MRR 114, and the fourth phase tuning curve 1112 indicates the phase $\phi_4$ 128 for the third additional first-arm MRR 116.

In some embodiments, the maximum in-band ripple of the eighth-order filter of FIGS. 10-11 has been demonstrated to be less than 0.5 dB, with no additional insertion loss being incurred due to bandwidth tuning.

It will be appreciated that the frequency responses of the fourth-order and eighth-order filters shown in FIGS. 7 and 10 exhibit a local minimum or trough directly adjacent to the central band of interest. This trough serves to further emphasize the central band of interest and facilitate the isolation of this frequency band of the filtered optical output 105 in some embodiments. In particular, for each tuned bandwidth, the trough of the fourth-order filter of FIG. 7 exhibits two out-of-band frequencies 720 (one on either side of the passband) having zero transmission (i.e. infinite attenuation) due to destructive interference. Similarly, the eighth-order filter of FIG. 10 exhibits six out-of-band frequencies 720 (three on either side of the passband) having infinite attenuation.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processor device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A device comprising:
an optical interferometer configured to split an optical input into a first path defined by a first arm and a second path defined by a second arm;
a first-arm microring resonator (MRR) operably coupled to the first arm for imparting a first-arm MRR frequency-dependent phase to an optical signal passing through the first arm;
a second-arm MRR operably coupled to the second arm for imparting a second-arm MRR frequency-dependent phase to an optical signal passing through the second arm;
a first-arm MRR tuner and a second-arm MRR tuner configured to tune the first-arm MRR frequency-dependent phase and the second-arm MRR frequency-dependent phase, respectively, such that:
the first-arm MRR and second-arm MRR share a common coupling coefficient; and
the first-arm MRR frequency-dependent phase is equal to the negative of the second-arm MRR frequency-dependent phase;
at least one additional pair of tunable MRRs, each additional pair of tunable MRRs comprising:
an additional first-arm MRR operably coupled to the first arm in series with the first-arm MRR for imparting an additional first-arm MRR frequency-dependent phase to an optical signal passing through the first arm;
an additional second-arm MRR operably coupled to the second arm in series with the second-arm MRR for imparting an additional second-arm MRR frequency-dependent phase to an optical signal passing through the second arm; and
an additional first-arm MRR tuner and an additional second-arm MRR tuner configured to tune the additional first-arm MRR frequency-dependent phase and the additional second-arm MRR frequency-dependent phase, respectively, independently from the first-arm MRR frequency-dependent phase and the second-arm MRR frequency-dependent phase, such that:

the additional first-arm MRR and additional second-arm MRR share a common coupling coefficient different from the common coupling coefficient of the first-arm MRR and second-arm MRR; and
the additional first-arm MRR frequency-dependent phase is equal to the negative of the additional second-arm MRR frequency-dependent phase; and
a coupler configured to combine an optical output of the first path and an optical output of the second path to generate a filtered optical output having a filter bandwidth and filter center frequency based on:
the first-arm MRR frequency-dependent phase and the second-arm MRR frequency-dependent phase; and
the first-arm MRR frequency-dependent phase of each additional first-arm MRR and the second-arm MRR frequency-dependent phase of each additional second-arm MRR.

2. The device of claim 1, wherein the optical interferometer is a Mach-Zehnder Interferometer (MZI).

3. The device of claim 2, wherein the first-arm MRR tuner and second-arm MRR tuner each comprises a thermal tuner.

4. The device of claim 3, wherein each thermal tuner comprises a heater operably coupled to its respective MRR.

5. The device of claim 2, wherein each tuner comprises a thermal tuner operably coupled to its respective MRR.

6. The device of claim 2, wherein the frequency-dependent phase of the first-arm MRR and the frequency-dependent phase of the second-arm MRR may be tuned such that:
the spectral response of the filtered optical output exhibits a second-order transfer function; and
the filter bandwidth may be adjusted between a minimum bandwidth and a maximum bandwidth without incurring insertion loss in the filtered optical output as a result of said bandwidth adjustment.

7. The device of claim 2, wherein:
the at least one additional pair of tunable MRRs comprises one additional pair of tunable MRRs; and
the frequency-dependent phase of each of the first-arm MRR, the second-arm MRR, the additional first-arm MRR, and the additional second-arm MRR may be tuned such that:
the spectral response of the filtered optical output exhibits a fourth-order transfer function;
the filter bandwidth may be adjusted between a minimum bandwidth and a maximum bandwidth without incurring insertion loss in the filtered optical output as a result of said bandwidth adjustment; and
the filtered optical signal has infinite attenuation at two out-of-band frequencies.

8. The device of claim 2, wherein:
the at least one additional pair of tunable MRRs comprises two additional pairs of tunable MRRs; and
the frequency-dependent phase of each of the first-arm MRR, the second-arm MRR, each additional first-arm MRR, and each additional second-arm MRR may be tuned such that:
the spectral response of the filtered optical output exhibits an eighth-order transfer function;
the filter bandwidth may be adjusted between a minimum bandwidth and a maximum bandwidth without incurring insertion loss in the filtered optical output as a result of said bandwidth adjustment; and
the filtered optical signal has infinite attenuation at six out-of-band frequencies.

9. A method comprising:
using an optical interferometer to split an optical input into a first path defined by a first arm and a second path defined by a second arm;
using a first-arm microring resonator (MRR) operably coupled to the first arm to apply a first frequency-dependent phase to the first path;
using a second-arm MRR operably coupled to the second arm to apply a second frequency-dependent phase to the second path;
using a first-arm MRR tuner and a second-arm MRR tuner to tune the first frequency-dependent phase and the second frequency-dependent phase, respectively, such that:
the first-arm MRR and second-arm MRR share a common coupling coefficient; and
the first frequency-dependent phase is equal to the negative of the second frequency-dependent phase;
using an additional first-arm MRR operably coupled to the first arm in series with the first-arm MRR to apply a first additional frequency-dependent phase to the first path;
using an additional second-arm MRR operably coupled to the second arm in series with the second-arm MRR to apply a second additional frequency-dependent phase to the second path;
using an additional first-arm MRR tuner and an additional second-arm MRR tuner to tune the first additional frequency-dependent phase and the second additional frequency-dependent phase, respectively, independently from the frequency-dependent phase of the first-arm MRR and the frequency-dependent phase of the second-arm MRR, such that:
the additional first-arm MRR and additional second-arm MRR share a common coupling coefficient different from the common coupling coefficient of the first-arm MRR and second-arm MRR; and
the first additional frequency-dependent phase is equal to the negative of the second additional frequency-dependent phase; and
using a coupler to combine an optical output of the first path and an optical output of the second path to generate a filtered optical output having a filter bandwidth and filter center frequency based on:
the first frequency-dependent phase and the second frequency-dependent phase; and
the first additional frequency-dependent phase and the second additional frequency-dependent phase.

10. The method of claim 9, wherein the optical interferometer is a Mach-Zehnder Interferometer (MZI).

11. The method of claim 10, wherein the first frequency-dependent phase and the second frequency-dependent phase may be tuned such that:
the filter bandwidth may be adjusted between a minimum bandwidth and a maximum bandwidth without incurring insertion loss in the filtered optical output as a result of said bandwidth adjustment.

12. The method of claim 9, wherein:
the first frequency-dependent phase, second frequency-dependent phase, first additional frequency-dependent phase, and second additional frequency-dependent phase may be tuned such that:
the spectral response of the filtered optical output exhibits a fourth-order transfer function;
the filter bandwidth may be adjusted between a minimum bandwidth and a maximum bandwidth without incurring insertion loss in the filtered optical output as a result of said bandwidth adjustment; and the filtered optical signal has infinite attenuation at two out-of-band frequencies.

* * * * *